United States Patent
Al-Harbi et al.

(10) Patent No.: US 11,708,526 B2
(45) Date of Patent: Jul. 25, 2023

(54) SANDSTONE STIMULATION FORMULATIONS

(71) Applicant: Saudi Arabian Oil Company, Dhahran (SA)

(72) Inventors: Bader Ghazi Al-Harbi, Dammam (SA); Mohammed H. Alkhaldi, Dammam (SA); Mohammed N. Aldahlan, Alkhobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/328,178

(22) Filed: May 24, 2021

(65) Prior Publication Data

US 2022/0372366 A1 Nov. 24, 2022

(51) Int. Cl.
*C09K 8/74* (2006.01)
*C09K 8/528* (2006.01)
*E21B 43/28* (2006.01)

(52) U.S. Cl.
CPC ............... *C09K 8/74* (2013.01); *C09K 8/528* (2013.01); *E21B 43/28* (2013.01)

(58) Field of Classification Search
None
See application file for complete search history.

(56) References Cited

U.S. PATENT DOCUMENTS

| | | | |
|---|---|---|---|
| 4,304,676 A | 12/1981 | Hall | |
| 6,506,711 B1 * | 1/2003 | Shuchart | C09K 8/78 507/277 |
| 6,531,427 B1 | 3/2003 | Shuchart et al. | |
| 7,947,629 B2 | 5/2011 | Fuller | |
| 10,526,862 B2 | 1/2020 | Witkowski et al. | |
| 2005/0016731 A1 * | 1/2005 | Rae | C09K 8/72 507/260 |
| 2006/0081370 A1 * | 4/2006 | Fu | C09K 8/74 166/308.1 |
| 2009/0042748 A1 | 2/2009 | Fuller | |

FOREIGN PATENT DOCUMENTS

| | | |
|---|---|---|
| CA | 3 077 866 A1 | 10/2020 |
| CA | 3 077 867 A1 | 10/2020 |
| WO | WO-2000/70186 A1 | 11/2000 |

OTHER PUBLICATIONS

Al-Harbi, B. G. et al., Aluminum and Iron Precipitation during Sandstone Acidizing Using Organic-HF Acids, Sau. Ara. Jrnl. Tech., 18-27 (2012).
Shuchart, C. E., and Gdanski, R. D., Improved Sucess in Acid Stimulations with a New Organic-HF System, Soc. Petro. Engin., SPE36907:327-334 (1996).
Shuchart, C. E., Chemical Study of Organic-HF Blends Leads to Improved Fluids, Soc. Petro. Engin., SPE37281:675-678 (1997).
International Search Report for PCT/IB2021/062046, 5 pages (dated Mar. 22, 2022).
Written Opinion for PCT/IB2021/062046, 11 pages (dated Mar. 22, 2022).

* cited by examiner

*Primary Examiner* — Andrew Sue-Ako
(74) *Attorney, Agent, or Firm* — Osha Bergman Watanabe & Burton LLP (57) ABSTRACT

Compositions and methods for acid stimulation of a subterranean sandstone formation.

19 Claims, 2 Drawing Sheets

SANDSTONE STIMULATION FORMULATIONS

TECHNICAL FIELD

This application relates to compositions and methods for acid stimulation of subterranean sandstone formations.

BACKGROUND

Acid stimulation ("acidization") of well-bores has been used for over 120 years to enhance oil recovery. Acidization is used on both old wells to restore productivity and new wells to increase initial productivity by allowing acid to react with the surface of the formation in the well to open new holes to the hydrocarbon reserves. The type of formation stimulated is an important factor in developing effective acidizing treatments. For example, HCl is often used to acidize carbonate formations, as carbonate-based materials readily dissolve in HCl. Sandstone minerals, however, are not appreciably soluble in HCl, and require the use of HF or mixtures containing HF. Commonly used mixtures for sandstone stimulation are mud acid, a mixture of HCl and HF, and organic-hydrofluoric acid mixtures. In sandstone acidization, HF-containing acid reacts with sand (quartz), feldspar and clays to form silicon fluorides and aluminum fluorides; silicon fluorides further react with clay and feldspar to release aluminum and silicon precipitates, which leads to formation damage.

SUMMARY

There exists a need in the oil and gas industry for improved methods for enhanced oil recovery techniques that avoid the problems of rapid spending, high corrosion, incompatibility with sensitive clays, and generation of damaging precipitates associated with previous methods.

In some aspects of the present disclosure are provided methods and compositions related to methods of acidizing a sandstone formation that avoid problems associated with previous technologies. For example, in some embodiments, the present disclosure provides a method of sandstone stimulation comprising a step of contacting a sandstone formation with an acidizing solution comprising hydrofluoric acid or a hydrofluoric acid-generating precursor and a first aluminum salt. In some embodiments, a method described herein further comprises a step of contacting a sandstone formation with a pre-flush solution comprising a first organic acid prior to contacting said sandstone formation with an acidizing solution. In some embodiments, a method described herein further comprises a step of contacting a sandstone formation with a post-acidizing solution comprising a second aluminum salt after contacting said sandstone formation with an acidizing solution. In some embodiments, a molar ratio of 1.9 or less of fluoride to aluminum is maintained in one or more steps of methods described herein. In some embodiments, a method is substantially free of aluminum fluoride precipitation.

In one aspect, the present disclosure provides a method of sandstone stimulation comprising a step of contacting a sandstone formation with an acidizing solution comprising hydrofluoric acid or a hydrofluoric acid-generating precursor and a first aluminum salt.

In some embodiments, the method further comprises a step of contacting the sandstone formation with a pre-flush solution comprising a first organic acid prior to contacting the sandstone formation with the acidizing solution.

In some embodiments, the method further comprises a step of contacting the sandstone formation with a post-acidizing solution comprising a second aluminum salt after contacting the sandstone formation with the acidizing solution.

In some embodiments, the first organic acid is selected from the group consisting of acetic acid, formic acid, citric acid, and combinations thereof.

In some embodiments, the first aluminum salt is aluminum chloride.

In some embodiments, the acidizing solution comprises a hydrofluoric acid-generating precursor comprising a second organic acid and an ammonium fluoride salt.

In some embodiments, the hydrofluoric acid-generating precursor comprises about 1% to about 3% by weight of hydrofluoric acid after a reaction of the second organic acid and the ammonium fluoride salt.

In some embodiments, the ammonium fluoride salt is ammonium bifluoride.

In some embodiments, the second organic acid is selected from the group consisting of acetic acid, formic acid, citric acid, and combinations thereof.

In some embodiments, the pre-flush solution further comprises a first ammonium salt.

In some embodiments, the post-acidizing solution further comprises a third organic acid.

In some embodiments, the third organic acid is selected from the group consisting of acetic acid, formic acid, citric acid, and combinations thereof.

In some embodiments, the second aluminum salt is aluminum chloride.

In some embodiments, the concentration of the first ammonium salt in the pre-flush solution is in a range of about 3 wt % to about 5 wt %.

In some embodiments, the first ammonium salt is ammonium chloride.

In some embodiments, the post-acidizing solution comprises ammonium chloride or potassium chloride.

In some embodiments, the post-acidizing solution comprises ammonium chloride at a concentration in a range of about 3 wt % to about 5 wt %.

In some embodiments, the acidizing solution has a molar ratio of ammonium fluoride to aluminum chloride of about 1.9:1 or less.

In some embodiments, the acidizing solution is substantially free of precipitate after contacting with the sandstone formation.

In some embodiments, the post-acidizing solution dissolves precipitate that forms after contacting the sandstone formation with the acidizing solution.

In some embodiments, a combination of the pre-flush, acidizing, and post-acidizing solutions in the sandstone formation has a fluoride to aluminum ratio of less than 1.9:1.

In some embodiments, the method further comprises a step of monitoring precipitation of aluminum fluoride.

In another aspect, the present disclosure provides an aqueous fluid for stimulation of a sandstone formation comprising a hydrofluoric acid-generating precursor and an aluminum salt. In some embodiments, a ratio of fluorine to aluminum (F/Al) is 1.9:1 or less.

In some embodiments, the aluminum salt is aluminum chloride.

In some embodiments, the hydrofluoric acid-generating precursor is an organic acid and an ammonium fluoride salt.

In some embodiments, the organic acid is selected from the group consisting of acetic acid, formic acid, citric acid, and combinations thereof.

In some embodiments, the ammonium fluoride salt is ammonium bifluoride.

In another aspect, the present disclosure provides a kit for treatment of a sandstone formation that contains a hydrocarbon reservoir. In some embodiments, the kit comprises a first aqueous fluid comprising a hydrofluoric acid-generating precursor and a second aqueous fluid comprising an aluminum salt.

In some embodiments, a combination of the first and second aqueous fluids results in a F/Al ratio of 1.9:1 or less.

In some embodiments, the hydrofluoric acid-generating precursor comprises an organic acid and an ammonium fluoride salt.

In some embodiments, the organic acid is selected from the group consisting of acetic acid, formic acid, citric acid, and combinations thereof.

In some embodiments, the ammonium fluoride salt is ammonium bifluoride.

In some embodiments, the aluminum salt is aluminum chloride.

In another aspect, the present disclosure provides an apparatus for stimulating sandstone acidization. In some embodiments, the apparatus comprises a first flow line configured to inject a pre-flush solution comprising a first organic acid into a sandstone formation; and a second flow line configured to inject an acidizing solution comprising a hydrofluoric acid-generating precursor and a first aluminum salt into the sandstone formation.

In some embodiments, the apparatus further comprises a third flow line configured to inject a post-acidizing solution comprising a second aluminum salt into the sandstone formation.

In some embodiments, the apparatus is further coupled to a sensor to monitor pH.

In some embodiments, the apparatus is further coupled to mass spectrometry and/or atomic emission spectroscopy to monitor aluminum fluoride precipitation.

In some embodiments, the first organic acid is selected from the group consisting of acetic acid, formic acid, citric acid, and combinations thereof.

In some embodiments, the pre-flush solution further comprising a first ammonium salt.

In some embodiments, the first ammonium salt is ammonium chloride.

In some embodiments, the hydrofluoric acid-generating precursor comprises a second organic acid and an ammonium fluoride salt.

In some embodiments, the second organic acid is selected from acetic acid, formic acid, citric acid, and combinations thereof.

In some embodiments, the ammonium fluoride salt is ammonium bifluoride.

In some embodiments, the second aluminum salt comprises aluminum chloride.

In some embodiments, the post-acidizing solution further comprises a third organic acid.

In some embodiments, the third organic acid is selected from the group consisting of acetic acid, formic acid, citric acid, and combinations thereof.

In some embodiments, the post-acidizing solution further comprises a second ammonium salt.

In some embodiments, the second ammonium salt is ammonium chloride.

In another aspect, the present disclosure provides a method of reducing aluminum fluoride precipitation during stimulation of a sandstone formation comprising steps of (a) contacting the sandstone formation with an acidizing solution comprising hydrofluoric acid or a hydrofluoric acid-generating precursor; and (b) introducing a first aluminum salt to thereby reduce aluminum fluoride precipitation.

In another aspect, the present disclosure provides a method of acidizing a sandstone formation comprising steps of (a) injecting a pre-flush solution comprising a first organic acid into the sandstone formation; and (b) injecting an acidizing solution comprising hydrofluoric acid or a hydrofluoric acid-generating precursor and a first aluminum salt into the sandstone formation.

In another aspect, the present disclosure provides a method of reducing aluminum fluoride precipitation during acidization of a sandstone formation comprising steps of (a) injecting a pre-flush solution comprising a first organic acid into the sandstone formation; and (b) injecting an acidizing solution comprising hydrofluoric acid or a hydrofluoric acid-generating precursor and a first aluminum salt into the sandstone formation.

In some embodiments, the method further comprises a step of injecting a post-acidizing solution comprising a second aluminum salt into the sandstone formation.

In some embodiments, the post-acidizing solution dissolves precipitate that forms after injecting the acidizing solution.

DEFINITIONS

Throughout the specification, several terms are employed that are defined in the following paragraphs. Other definitions may also be found within the body of the specification.

About, Approximately: As used in the present disclosure, the terms "about" and "approximately," in reference to a number, are used to include numbers that fall within a range of 20%, 10%, 5%, 1%, or 0.5% in either direction of (greater than or less than, or ±each indicated number, for example, "about 20%" can refer to ±20% of an indicated value) the number unless otherwise stated or otherwise evident from the context (except where such number would exceed 100% of a possible value).

Downhole equipment: As used in the present disclosure, the term "downhole equipment" refers to devices used to measure conditions inside an oil or gas well. For example, in some embodiments, downhole equipment includes a pressure sensor for measuring pressure inside an oil well. In some embodiments, downhole equipment includes a temperature sensor for measuring temperature inside an oil well. In some embodiments, downhole equipment includes a pressure sensor and a temperature sensor. As used in the present disclosure, the term "oil well" means a boring (for example, a drilled hole or tunnel) in the earth that is designed to bring hydrocarbons (for example, oil) from an underground hydrocarbon reservoir to the surface.

Substantially free of: As used in the present disclosure, the term "substantially free of" refers to having about 0% to about 1% by weight of a particular material or component. For example, in some embodiments, wherein an acidizing solution is substantially free of precipitate, said acidizing solution may have about 0% to about 1% by weight of a precipitate.

BRIEF DESCRIPTION OF THE DRAWINGS

In the drawings, like reference characters generally refer to the same parts throughout different views. Also, the drawings are not necessarily to scale, emphasis instead generally being placed upon illustrating the principles of the disclosure and are not intended as a definition of the limits of the disclosure. For purposes of clarity, not every component may be labeled in every drawing. In the following description, various embodiments of the present disclosure are described with reference to the following drawings, in which.

DETAILED DESCRIPTION

It is contemplated that systems, devices, methods, and processes of the present application encompass variations and adaptations developed using information from embodiments described in the following description. Adaptation and/or modification of methods and processes described herein may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, recited processing steps.

It should be understood that order of steps or order for performing certain actions is immaterial so long as a described method remains operable. Moreover, two or more steps or actions are, in some embodiments, conducted simultaneously.

Mention in the present application of any publication, for example, in the Background section, is not an admission that the publication serves as prior art with respect to any of the presented claims. The Background section is presented for purposes of clarity and is not meant as a description of prior art with respect to any claim. Headers are provided for convenience of the reader and are not intended to be limiting with respect to claimed subject matter.

As described herein, there exists a need in the oil and gas industry for enhanced methods of oil recovery. One manner of enhanced oil recovery is by acidization. Sandstone acidization generally requires hydrofluoric acid to afford effective dissolution of sand (quartz), feldspar, and clays. The most common acidization process uses mud acid, a mixture of HF and HCl. However, use of HCl in the mud acid is limited by such factors as rapid spending, especially at elevated temperatures, HCl sensitivity of clays, and high corrosion rates, which result in variable success of mud acid stimulation, and in some instances further cause formation damage. In attempts to identify alternatives to using HCl, organic acid-HF mixtures were developed, but suffer other deficiencies. For example, organic acids are unable to dissolve aluminum fluoride precipitates, which form as a by-product of reaction of HF with a sandstone formation. Such precipitates are known to cause damage to the formation. Therefore, to date, industrial application of sandstone acidization using organic acid-HF mixtures has been limited.

Previous work has identified that precipitates form by the reaction of hydrofluoric acid and aluminumsilicates, including aluminum hydroxide ($Al(OH)_3$) and aluminum fluoride ($AlF_3$). See Al-Harbi, et al., *Saudi Aramco J. of Tech.*, Spring 2012: 18-27. The present disclosure encompasses the recognition that precipitation of aluminum fluoride species, can be controlled or otherwise prevented depending on the F/Al ratio present during an acidization process.

The present disclosure provides, among other things, solutions to the problems associated with mud acids and previous organic acid-HF mixtures that allow for acidization of sandstone formations without increased corrosion or substantial precipitates.

Methods of Acidizing

In some embodiments, the present disclosure provides a method of sandstone acidization comprising contacting a sandstone formation with an acidizing solution comprising hydrofluoric acid or a hydrofluoric acid-generating precursor and a first aluminum salt. As described herein, the present disclosure encompasses the recognition that previous formulations cause the generation of precipitates during the reaction of hydrofluoric acid and the sandstone formation, which are harmful to the formation. For example, in some embodiments, provided methods control or otherwise prevent or eliminate said precipitates, thereby avoid potential formation damage. Without being bound by theory, such control over precipitate formation is provided, at least in part, by maintaining a ratio of fluoride to aluminum (i.e., F/Al) in an amount that is 2:1 by weight or less.

In some embodiments, compositions and methods described in this application involve generating acid upon or after arriving at a formation, for example by delivering reagents described in this application to a formation via a coiled tubing or bull heading in a production tube, depending on whether application of a method is acid fracturing or matrix acidizing, respectively. In some embodiments, an acid is generated within a formation itself. In some embodiments, an acid is generated prior to contact with a formation.

In some embodiments, a method of sandstone acidization comprises injection of three solutions. In some embodiments, a method comprises a step of injecting an acidizing solution comprising hydrofluoric acid or a hydrofluoric acid-generating precursor to dissolve clays. In some embodiments, a method further comprises a step of injecting a pre-flush solution, for example, prior to injection of an acidizing solution. In some embodiments, a pre-flush solution is injected to dissolve calcium-based rocks. In some embodiments, wherein a method comprises a step of injecting a pre-flush solution to dissolve calcium-based rocks, followed by a step of injecting an acidizing solution comprising HF or an HF-generating precursor, calcium fluoride does not precipitate. In some embodiments, wherein a method comprises a step of injecting a pre-flush solution to dissolve calcium-based rocks, followed by a step of injecting an acidizing solution comprising HF or an HF-generating precursor, such method of sandstone acidizing is substantially free of calcium fluoride precipitation. In some embodiments, an acidizing solution further comprises an aluminum salt to control F/Al ratio. In some embodiments, a F/Al ratio is controlled by increasing or decreasing the amount of an aluminum salt in a acidizing solution. In some embodiments, a method further comprises a step of injecting a post-acidizing solution. In some embodiments, a post-acidizing solution further comprises a specified amount of an aluminum salt to control F/Al ratio. In some embodiments, a F/Al ratio is controlled by increasing or decreasing the amount of an aluminum salt in a post-acidizing solution.

In some embodiments, the present disclosure provides a method of acidization of a sandstone formation comprising a step of contacting a sandstone formation with an acidizing solution comprising hydrofluoric acid or a hydrofluoric acid-generating precursor and a first aluminum salt. In some embodiments, a method of acidization of a sandstone formation further comprises a step of contacting the sandstone formation with a pre-flush solution comprising a first organic acid prior to contacting the sandstone formation with the acidizing solution. In some embodiments, a method of acidization of a sandstone formation further comprises a step of contacting the sandstone formation with a post-acidizing solution comprising a second aluminum salt after contacting the sandstone formation with the acidizing solution. In some embodiments, a method of acidization of a sandstone formation further comprises a step of monitoring precipitation of aluminum fluoride. In some embodiments, aluminum and fluoride levels are measured by inductively coupled plasma (ICP) analysis of flowback samples.

In some embodiments, the present disclosure provides a method of acidizing a sandstone formation comprising steps of: injecting a pre-flush solution comprising an organic acid and an ammonium salt into a sandstone formation; injecting an acidizing solution comprising an organic acid, ammonium fluoride, and an aluminum salt into a sandstone formation; and injecting a post-acidizing solution comprising an organic acid, a specified amount of an aluminum salt, and an ammonium salt into a sandstone formation. In some embodiments, the present disclosure relates to a method of acidizing a sandstone formation comprising the steps of: injecting a pre-flush solution comprising an organic acid and ammonium chloride into a sandstone formation; injecting an acidizing solution comprising an organic acid, ammonium fluoride, and aluminum chloride into a sandstone formation; and injecting a post-acidizing solution comprising an organic acid, a specified amount of aluminum chloride, and ammonium chloride into a sandstone formation.

In some embodiments, an acidizing solution is free of precipitate after contacting with the sandstone formation. In some embodiments, a post-acidizing solution dissolves precipitate that forms after contacting a sandstone formation with an acidizing solution. In some embodiments, a combination of the pre-flush, acidizing, and post-acidizing solutions in the sandstone formation has a fluoride to aluminum ratio of less than 1.9:1.

In some embodiments, the present disclosure provides a method of reducing aluminum fluoride precipitation during stimulation of a sandstone formation comprising steps of: (a) contacting the sandstone formation with an acidizing solution comprising hydrofluoric acid or a hydrofluoric acid-generating precursor; and (b) introducing a first aluminum salt to thereby reduce aluminum fluoride precipitation.

In some embodiments, the present disclosure provides a method of acidizing a sandstone formation comprising steps of: (a) injecting a pre-flush solution comprising a first organic acid into the sandstone formation; and (b) injecting an acidizing solution comprising hydrofluoric acid or a hydrofluoric acid-generating precursor and a first aluminum salt into the sandstone formation.

In some embodiments, the present disclosure provides a method of reducing aluminum fluoride precipitation during acidization of a sandstone formation comprising steps of: (a) injecting a pre-flush solution comprising a first organic acid into the sandstone formation; and (b) injecting an acidizing solution comprising hydrofluoric acid or a hydrofluoric acid-generating precursor and a first aluminum salt into the sandstone formation.

In some embodiments, a method further comprises a step of injecting a post-acidizing solution comprising a second aluminum salt into the sandstone formation. In some embodiments, a post-acidizing solution dissolves precipitate that forms after injecting an acidizing solution.

Acidizing Solutions

In some embodiments, a method of sandstone acidization comprises injecting an acidizing solution into a formation. In some embodiments, an acidizing solution comprises a hydrofluoric acid or a hydrofluoric acid-generating precursor and an aluminum salt. In some embodiments, an acidizing solution comprises a hydrofluoric acid-generating precursor comprising an organic acid and an ammonium fluoride salt. In some embodiments, an ammonium fluoride salt is ammonium bifluoride. In some embodiments, an acidizing solution comprises an organic acid, ammonium bifluoride, and an aluminum salt. In some embodiments, an organic acid is selected from the group consisting of carboxylic acids, phosphonic acids, sulfonic acids, and combinations thereof. In some embodiments, an organic acid is a chelating agent. In some embodiments, an organic acid is selected from the group consisting of acetic acid, formic acid, lactic acid, malic acid, citric acid, methanesulfonic acid, ethanesulfonic acid, benzenesulfonic acid, p-toluenesulfonic acid, methylphosphonic acid, ethylphosphonic acid, phenylphosphonic acid, and combinations thereof. In some embodiments, an organic acid is selected from the group consisting of acetic acid, formic acid, lactic acid, malic acid, citric acid, and combinations thereof. In some embodiments, an organic acid is selected from the group consisting of acetic acid, formic acid, citric acid, and combinations thereof. In some embodiments, an organic acid comprises acetic acid. In some embodiments, an organic acid comprises formic acid. In some embodiments, an organic acid comprises lactic acid. In some embodiments, an organic acid comprises malic acid. In some embodiments, an organic acid comprises citric acid. In some embodiments, an aluminum salt is selected from the group consisting of aluminum bromide, aluminum chloride, aluminum sulfate, aluminum trifluoromethanesulfonate, aluminum phosphate, aluminum hydroxide, and combinations thereof. In some embodiments, an aluminum salt comprises aluminum bromide. In some embodiments, an aluminum salt comprises aluminum chloride. In some embodiments, an aluminum salt comprises aluminum sulfate.

In some embodiments, an acidizing solution comprises an ammonium fluoride salt in an amount that produces a hydrofluoric acid concentration in a range of about 0.1% to about 10% after hydrolysis of the ammonium fluoride salt. In some embodiments, an acidizing solution comprises an ammonium fluoride salt in an amount that produces a hydrofluoric acid concentration in a range of about 0.1% to about 5% after hydrolysis of the ammonium fluoride salt. In some embodiments, an acidizing solution comprises an ammonium fluoride salt in an amount that produces a hydrofluoric acid concentration in a range of about 1% to about 5% after hydrolysis of the ammonium fluoride salt. In some embodiments, an acidizing solution comprises an ammonium fluoride salt in an amount that produces a hydrofluoric acid concentration in a range of about 1% to about 3% after hydrolysis of the ammonium fluoride salt. In some embodiments, an acidizing solution comprises an ammonium fluoride salt in an amount that produces a hydrofluoric acid concentration of about 1% after hydrolysis of the ammonium fluoride salt. In some embodiments, an acidizing solution comprises an ammonium fluoride salt in an amount that produces a hydrofluoric acid concentration of about 1.5% after hydrolysis of the ammonium fluoride salt. In some embodiments, an acidizing solution comprises an ammonium fluoride salt in an amount that produces a hydrofluoric acid concentration of about 2% after hydrolysis of the ammonium fluoride salt. In some embodiments, an acidizing solution comprises an ammonium fluoride salt in an amount that produces a hydrofluoric acid concentration of about 2.5% after hydrolysis of the ammonium fluoride salt. In some embodiments, an acidizing solution comprises an ammonium fluoride salt in an amount that produces a hydrofluoric acid concentration of about 3% after hydrolysis of the ammonium fluoride salt.

In some embodiments, an acidizing solution comprises an organic acid, ammonium fluoride and aluminum chloride. In some embodiments, an acidizing solution comprises an organic acid selected from the group consisting of acetic acid, formic acid, lactic acid, malic acid, citric acid, and combinations thereof, ammonium fluoride, and aluminum chloride. In some embodiments, an acidizing solution comprises an organic acid selected from the group consisting of acetic acid, formic acid, citric acid, and combinations thereof, ammonium fluoride, and aluminum chloride. In some embodiments, an acidizing solution comprises acetic acid, ammonium fluoride, and aluminum chloride. In some embodiments, an acidizing solution comprises formic acid, ammonium fluoride, and aluminum chloride. In some embodiments, an acidizing solution comprises lactic acid, ammonium fluoride, and aluminum chloride. In some embodiments, an acidizing solution comprises malic acid, ammonium fluoride, and aluminum chloride. In some embodiments, an acidizing solution comprises citric acid, ammonium fluoride, and aluminum chloride.

In some embodiments, an acidizing solution has a molar ratio of fluoride to aluminum of about 1.9:1 or less. In some embodiments, an acidizing solution has a molar ratio of fluoride to aluminum of about 1.8:1 or less, about 1.7:1 or less, about 1.6:1 or less about 1.5:1 or less, about 1.4:1 or less, about 1.3:1 or less, about 1.2:1 or less, about 1.1:1 or less, about 1:1 or less, or about 0.5:1 or less.

Pre-Flush Solutions

In some embodiments, a method described herein further comprises, prior to contacting a sandstone formation with an acidizing solution, contacting the sandstone formation with a pre-flush solution. In some embodiments, a pre-flush solution comprises an organic acid and an ammonium salt. In some embodiments, an organic acid is selected from the group consisting of carboxylic acids, phosphonic acids, sulfonic acids, and combinations thereof. In some embodiments, an organic acid is a chelating agent. In some embodiments, an organic acid is selected from the group consisting of acetic acid, formic acid, lactic acid, malic acid, citric acid, methanesulfonic acid, ethanesulfonic acid, benzenesulfonic acid, p-toluenesulfonic acid, methylphosphonic acid, ethylphosphonic acid, phenylphosphonic acid, and combinations thereof. In some embodiments, an organic acid is selected from the group consisting of acetic acid, formic acid, lactic acid, malic acid, citric acid, and combinations thereof. In some embodiments, an organic acid is selected from the group consisting of acetic acid, formic acid, citric acid, and combinations thereof. In some embodiments, an organic acid comprises acetic acid. In some embodiments, an organic acid comprises formic acid. In some embodiments, an organic acid comprises lactic acid. In some embodiments, an organic acid comprises malic acid. In some embodiments, an ammonium salt is selected from the group consisting of ammonium bromide, ammonium chloride, ammonium formate, ammonium tartrate, ammonium trifluoroacetate, and combinations thereof. In some embodiments, an organic acid comprises citric acid. In some embodiments, an ammonium salt comprises ammonium chloride.

In some embodiments, a pre-flush solution comprises a chelating agent and an ammonium salt. In some embodiments, a chelating agent is selected from the group consisting of 1,2-cyclohexanediaminetetraacetic acid (CDTA), diethylenetriamineepentaacetic acid (DTPA), ethanol-diglycinic acid (EDG), ethylenediamineteraacetic acid (EDTA), L-glutamic acid N,N-diacetic acid, tetra sodium salt (GLDA), hydroxyaminocarboxylic acid (HACA), HEDTA (N-hydroxyethyl-ethylenediamine-triacetic acid), hydroxyethyleneiminodiacetate (HEIDA), N,N'-bis(carboxymethyl) glycine (NTA), sodium hexametaphosphate (SHMP), tetraammonium EDTA, and derivatives and mixtures thereof.

In some embodiments, a pre-flush solution comprises an ammonium salt in a concentration in a range of about 0.1 wt % to about 15 wt %. In some embodiments, a pre-flush solution comprises an ammonium salt in a concentration in a range of about 1 wt % to about 10 wt %. In some embodiments, a pre-flush solution comprises an ammonium salt in a concentration in a range of about 1 wt % to about 7 wt %. In some embodiments, a pre-flush solution comprises an ammonium salt in a concentration in a range of about 3 wt % to about 5 wt %.

In some embodiments, a pre-flush solution comprises an organic acid and ammonium chloride. In some embodiments, a pre-flush solution comprises an organic acid selected from the group consisting of acetic acid, formic acid, lactic acid, malic acid, citric acid, and combinations thereof, and ammonium chloride. In some embodiments, a pre-flush solution comprises an organic acid selected from the group consisting of acetic acid, formic acid, citric acid, and combinations thereof, and ammonium chloride. In some embodiments, a pre-flush solution comprises acetic acid and ammonium chloride. In some embodiments, a pre-flush solution comprises formic acid and ammonium chloride. In some embodiments, a pre-flush solution comprises lactic acid and ammonium chloride. In some embodiments, a pre-flush solution comprises malic acid and ammonium chloride. In some embodiments, a pre-flush solution comprises citric acid and ammonium chloride.

Post-Acidizing Solutions

In some embodiments, a method described herein further comprises, after contacting a sandstone formation with an acidizing solution, contacting the sandstone formation with a post-acidizing solution. In some embodiments, a post-acidizing solution comprises an organic acid, an aluminum salt, and an ammonium salt. In some embodiments, a post-acidizing solution comprises an organic acid, an aluminum salt, and potassium chloride. In some embodiments, an organic acid is selected from the group consisting of acetic acid, formic acid, lactic acid, malic acid, citric acid, and combinations thereof. In some embodiments, an organic acid is selected from the group consisting of carboxylic acids, phosphonic acids, sulfonic acids, and combinations thereof. In some embodiments, an organic acid is a chelating agent. In some embodiments, an organic acid is selected from the group consisting of acetic acid, formic acid, lactic acid, malic acid, citric acid, methanesulfonic acid, ethanesulfonic acid, benzenesulfonic acid, p-toluenesulfonic acid, methylphosphonic acid, ethylphosphonic acid, phenylphosphonic acid, and combinations thereof. In some embodiments, an organic acid is selected from the group consisting of acetic acid, formic acid, citric acid, and combinations thereof. In some embodiments, an organic acid comprises acetic acid. In some embodiments, an organic acid comprises formic acid. In some embodiments, an organic acid comprises lactic acid. In some embodiments, an organic acid comprises malic acid. In some embodiments, an organic acid comprises citric acid. In some embodiments, an ammonium salt is selected from the group consisting of ammonium bromide, ammonium chloride, ammonium formate, ammonium tartrate, ammonium trifluoroacetate, and combinations thereof. In some embodiments, an ammonium salt comprises ammonium chloride. In some embodiments, an aluminum salt is selected from the group consisting of aluminum bromide, aluminum chloride, aluminum sulfate, aluminum trifluoromethanesulfonate, aluminum phosphate, aluminum hydroxide, and combinations thereof. In some embodiments, an aluminum salt comprises aluminum bromide. In some embodiments, an aluminum salt comprises aluminum chloride. In some embodiments, an aluminum salt comprises aluminum sulfate.

In some embodiments, a post-acidizing solution comprises an ammonium salt in a concentration in a range of about 0.1 wt % to about 15 wt %. In some embodiments, a post-acidizing solution comprises an ammonium salt in a concentration in a range of about 1 wt % to about 10 wt %. In some embodiments, a post-acidizing solution comprises an ammonium salt in a concentration in a range of about 1 wt % to about 7 wt %. In some embodiments, a post-acidizing solution comprises an ammonium salt in a concentration in a range of about 3 wt % to about 5 wt %.

In some embodiments, a post-acidizing solution comprises potassium chloride in a concentration in a range of about 0.1 wt % to about 15 wt %. In some embodiments, a post-acidizing solution comprises potassium chloride in a concentration in a range of about 1 wt % to about 10 wt %. In some embodiments, a post-acidizing solution comprises potassium chloride in a concentration in a range of about 1 wt % to about 7 wt %. In some embodiments, a post-acidizing solution comprises potassium chloride in a concentration in a range of about 3 wt % to about 5 wt %.

In some embodiments, a post-acidizing solution comprises an organic acid, a specified amount of aluminum chloride, and ammonium chloride. In some embodiments, a post-acidizing solution comprises an organic acid selected from the group consisting of acetic acid, formic acid, lactic acid, malic acid, citric acid, and combinations thereof, a specified amount of aluminum chloride, and ammonium chloride. In some embodiments, a post-acidizing solution comprises an organic acid selected from the group consisting of acetic acid, formic acid, citric acid, and combinations thereof, a specified amount of aluminum chloride, and ammonium chloride. In some embodiments, a post-acidizing solution comprises acetic acid, a specified amount of aluminum chloride, and ammonium chloride. In some embodiments, a post-acidizing solution comprises formic acid, a specified amount of aluminum chloride, and ammonium chloride. In some embodiments, a post-acidizing solution comprises lactic acid, a specified amount of aluminum chloride, and ammonium chloride. In some embodiments, a post-acidizing solution comprises malic acid, a specified amount of aluminum chloride, and ammonium chloride. In some embodiments, a post-acidizing solution comprises citric acid, a specified amount of aluminum chloride, and ammonium chloride.

In some embodiments, a post-acidizing solution has a molar ratio of fluoride to aluminum of about 1.9:1 or less. In some embodiments, a post-acidizing solution has a molar ratio of fluoride to aluminum of about 1.8:1 or less, about 1.7:1 or less, about 1.6:1 or less, about 1.5:1 or less, about 1.4:1 or less, about 1.3:1 or less, about 1.2:1 or less, about 1.1:1 or less, about 1:1 or less, or about 0.5:1 or less.

Controlling Precipitates

As described herein, provided methods control a ratio of fluoride to aluminum to thereby prevent or otherwise eliminate precipitates from contacting a sandstone formation that has been subjected to acidization. For example, in some embodiments, an amount of the aluminum salt in an acidizing or post-acidizing solution results in a F/Al ratio of no more than about 2.0 in a formation. In some embodiments, an amount of an aluminum salt in an acidizing or post-acidizing solution results in a F/Al ratio of no more than about 1.9 in a formation. In some embodiments, an amount of the aluminum salt in an acidizing or post-acidizing solution results in a F/Al ratio of less than about 1.9. In some embodiments, an amount of the aluminum salt in an acidizing or post-acidizing solution results in a F/Al ratio of about 1.8. In some embodiments, an amount of an aluminum salt in an acidizing or post-acidizing solution results in a F/Al ratio of about 1.7. In some embodiments, an amount of an aluminum salt in an acidizing or post-acidizing solution results in a F/Al ratio of about 1.6. In some embodiments, an amount of an aluminum salt in an acidizing or post-acidizing solution results in a F/Al ratio of about 1.5. In some embodiments, an amount of an aluminum salt in an acidizing or post-acidizing solution results in a F/Al ratio of about 1.4. In some embodiments, an amount of an aluminum salt in an acidizing or post-acidizing solution results in a F/Al ratio of about 1.3. In some embodiments, an amount of an aluminum salt in an acidizing or post-acidizing solution results in a F/Al ratio of about 1.2. In some embodiments, an amount of an aluminum salt in an acidizing or post-acidizing solution results in a F/Al ratio of about 1. In some embodiments, an amount of an aluminum salt in an acidizing or post-acidizing solution results in a F/Al ratio of about 0.5.

Stimulation Fluids

In some embodiments, the present disclosure provides aqueous fluids for stimulation of a sandstone formation. In some embodiments, an aqueous fluid for stimulation of a sandstone formation comprises a hydrofluoric acid-generating precursor and an aluminum salt, wherein a ratio of fluorine to aluminum (F/Al) is 1.9:1 or less. In some embodiments, the F/Al ratio is 1.8 or less, about 1.7:1 or less, about 1.6:1 or less, about 1.5:1 or less, about 1.4:1 or less, about 1.3:1 or less, about 1.2:1 or less, about 1.1:1 or less, about 1:1 or less, or about 0.5:1 or less.

In some embodiments, an aluminum salt is selected from the group consisting of aluminum bromide, aluminum chloride, aluminum sulfate, aluminum trifluoromethanesulfonate, aluminum phosphate, aluminum hydroxide, and combinations thereof. In some embodiments, an aluminum salt comprises aluminum bromide. In some embodiments, an aluminum salt comprises aluminum chloride. In some embodiments, an aluminum salt comprises aluminum sulfate.

In some embodiments, a hydrofluoric acid-generating precursor is an organic acid and an ammonium fluoride salt. In some embodiments, an organic acid is selected from the group consisting of carboxylic acids, phosphonic acids, sulfonic acids, and combinations thereof. In some embodiments, an organic acid is a chelating agent. In some embodiments, an organic acid is selected from the group consisting of acetic acid, formic acid, lactic acid, malic acid, citric acid, methanesulfonic acid, ethanesulfonic acid, benzenesulfonic acid, p-toluenesulfonic acid, methylphosphonic acid, ethylphosphonic acid, phenylphosphonic acid, and combinations thereof. In some embodiments, an organic acid is selected from the group consisting of acetic acid, formic acid, citric acid, and combinations thereof. In some embodiments, an organic acid comprises acetic acid. In some embodiments, an organic acid comprises formic acid. In some embodiments, an organic acid comprises lactic acid. In some embodiments, an organic acid comprises malic acid. In some embodiments, an organic acid comprises citric acid. In some embodiments, an ammonium fluoride salt is ammonium bifluoride.

Kits

In some embodiments, the present disclosure provides kits for treatment of a sandstone formation that contains a hydrocarbon reservoir. In some embodiments, a kit for treatment of a sandstone formation that contains a hydrocarbon reservoir, comprises a first aqueous fluid comprising a hydrofluoric acid-generating precursor and a second aqueous fluid comprising an aluminum salt. In some embodiments, a combination of the first and second aqueous fluids results in a F/Al ratio of 1.9:1 or less. In some embodiments, a combination of the first and second aqueous fluids results in a F/Al ratio of 1.8 or less, about 1.7:1 or less, about 1.6:1 or less about 1.5:1 or less, about 1.4:1 or less, about 1.3:1 or less, about 1.2:1 or less, about 1.1:1 or less, about 1:1 or less, or about 0.5:1 or less.

In some embodiments, a hydrofluoric acid-generating precursor comprises an organic acid and an ammonium fluoride salt. In some embodiments, an organic acid is selected from the group consisting of carboxylic acids, phosphonic acids, sulfonic acids, and combinations thereof. In some embodiments, an organic acid is a chelating agent. In some embodiments, an organic acid is selected from the group consisting of acetic acid, formic acid, lactic acid, malic acid, citric acid, methanesulfonic acid, ethanesulfonic acid, benzenesulfonic acid, p-toluenesulfonic acid, methylphosphonic acid, ethylphosphonic acid, phenylphosphonic acid, and combinations thereof. In some embodiments, an organic acid is selected from the group consisting of acetic acid, formic acid, citric acid, and combinations thereof. In some embodiments, an organic acid comprises acetic acid. In some embodiments, an organic acid comprises formic acid. In some embodiments, an organic acid comprises lactic acid. In some embodiments, an organic acid comprises malic acid. In some embodiments, an organic acid comprises citric acid. In some embodiments, an ammonium fluoride salt is ammonium bifluoride.

In some embodiments, an aluminum salt is selected from the group consisting of aluminum bromide, aluminum chloride, aluminum sulfate, aluminum trifluoromethanesulfonate, aluminum phosphate, aluminum hydroxide, and combinations thereof. In some embodiments, an aluminum salt comprises aluminum bromide. In some embodiments, an aluminum salt comprises aluminum chloride. In some embodiments, an aluminum salt comprises aluminum sulfate.

Apparatus

In some embodiments, the present disclosure provides an apparatus for stimulating sandstone acidization. In some embodiments, an apparatus for stimulating sandstone acidization comprises a first flow line configured to inject a pre-flush solution comprising a first organic acid into a sandstone formation; and a second flow line configured to inject an acidizing solution comprising a hydrofluoric acid-generating precursor and a first aluminum salt into the sandstone formation. In some embodiments, an apparatus further comprises a third flow line configured to inject a post-acidizing solution comprising a second aluminum salt into the sandstone formation. In some embodiments, an apparatus is further coupled to an inductively coupled plasma instrument. For example, an inductively coupled plasma instrument is selected from the group consisting of an inductively coupled plasma-optical emission spectrometer, an inductively coupled plasma-mass spectrometer, an inductively coupled plasma-atomic emission spectrometer and combinations thereof.

In some embodiments, a sandstone formation comprises one or more water injector wells, one or more disposal wells, and/or one or more geothermal wells. In some embodiments, a sandstone formation contains a hydrocarbon reservoir.

In some embodiments, compositions and methods described in this application are useful for acidizing a well formation, for instance water injection wells, disposal wells, geothermal wells, or injectors, for instance to improve injectivity. The injector, in some embodiments, is a water injector or a gas injector. The disposal well, in some embodiments, is a water disposal well or a drill cuttings disposal well.

In some embodiments, a pre-flush solution further comprises an ammonium salt. In some embodiments, a post-acidizing solution further comprises an ammonium salt. In some embodiments, a hydrofluoric acid-generating precursor comprises an organic acid and an ammonium fluoride salt.

In some embodiments, an organic acid is selected from the group consisting of carboxylic acids, phosphonic acids, sulfonic acids, and combinations thereof. In some embodiments, an organic acid is a chelating agent. In some embodiments, an organic acid is selected from the group consisting of acetic acid, formic acid, lactic acid, malic acid, citric acid, methanesulfonic acid, ethanesulfonic acid, benzenesulfonic acid, p-toluenesulfonic acid, methylphosphonic acid, ethylphosphonic acid, phenylphosphonic acid, and combinations thereof. In some embodiments, an organic acid is selected from the group consisting of acetic acid, formic acid, citric acid, and combinations thereof. In some embodiments, an organic acid comprises acetic acid. In some embodiments, an organic acid comprises formic acid. In some embodiments, an organic acid comprises lactic acid. In some embodiments, an organic acid comprises malic acid. In some embodiments, an organic acid comprises citric acid.

In some embodiments, an ammonium salt is selected from the group consisting of ammonium bromide, ammonium chloride, ammonium formate, ammonium tartrate, ammonium trifluoroacetate, and combinations thereof. In some embodiments, an ammonium salt comprises ammonium chloride.

In some embodiments, an ammonium fluoride salt is ammonium bifluoride.

In some embodiments, an aluminum salt is selected from the group consisting of aluminum bromide, aluminum chloride, aluminum sulfate, aluminum trifluoromethanesulfonate, aluminum phosphate, aluminum hydroxide, and combinations thereof. In some embodiments, an aluminum salt comprises aluminum bromide. In some embodiments, an aluminum salt comprises aluminum chloride. In some embodiments, an aluminum salt comprises aluminum sulfate.

EXEMPLARY EMBODIMENTS

In order that the application may be more fully understood, the following examples are set forth. It should be understood that these examples are for illustrative purposes only and are not to be construed as limiting in any manner.

As proof-of-concept, two types of experiments were conducted to probe dissolution of aluminum and impact of F/Al ratio on precipitate formation.

Example 1. Aluminum Dissolution Experiments

Figure 1:
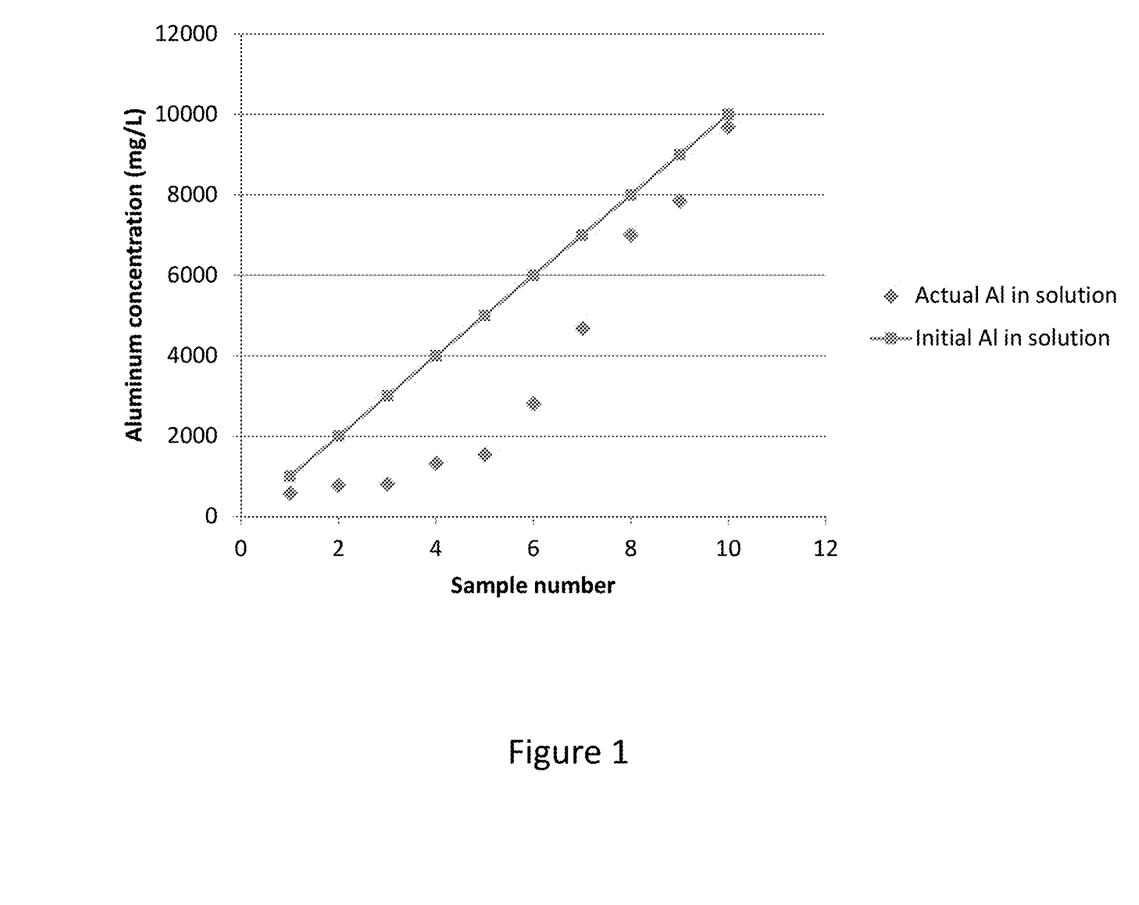
FIG. 1 is a graphical representation of aluminum concentration in accordance with one embodiment of the disclosure, illustrating the amount of aluminum in solution relative to the amount of aluminum initially added to the sample.

The objective of this series of experiments was to evaluate impact of Al concentration on solubility of reaction products between HF and an aluminum source. In a typical experiment, the following steps were performed:
  A citric acid-1.5% HF acid solution was prepared.
  Aluminum chloride was added to an acid solution in an amount required to prepare a targeted concentration.
  An aliquot of the solution was filtered and analyzed by ICP to measure aluminum concentration.
  Aluminum chloride was added to prepared citric acid-1.5% HF acid solutions in amounts sufficient to produce Al concentrations ranging from 1,000 mg/L to 10,000 mg/L. At low aluminum concentrations, aluminum precipitation was observed. As a targeted aluminum concentration increased, observed precipitation decreased or was prevented entirely. For example, at a targeted Al concentration of 1000 mg/L, measured Al concentration by ICP analysis was 583 mg/L, while at a targeted concentration of 10,000 mg/L, measured Al concentration by ICP analysis was 9676 mg/L. Results of these experiment are depicted graphically in FIG. 1.

TABLE 1

Measured Al Concentration in Citric Acid-1.5% HF Solutions

| Exp. No. | Targeted Al Concentration (mg/L) | Actual Al Concentration (mg/L) |
|---|---|---|
| 1 | 1000 | 583 |
| 2 | 2000 | 763 |
| 3 | 3000 | 818 |
| 4 | 4000 | 1326 |
| 5 | 5000 | 1530 |
| 6 | 6000 | 2795 |
| 7 | 7000 | 4678 |
| 8 | 8000 | 7008 |
| 9 | 9000 | 7840 |
| 10 | 10000 | 9676 |

In a typical sandstone acidizing procedure, HF will react with aluminum in a formation to form insoluble $AlF_3$, which precipitates in a porous space of a formation and, in some instances, causes severe formation damage. Results of this experiment suggest that increasing concentration of aluminum in a stimulation solution decreases formation of precipitates, and consequently reduces damage to a sandstone formation treated with an organic acid-HF stimulation solution.

Example 2. Modulation of F/Al Ratio to Prevent Precipitation

Figure 2:
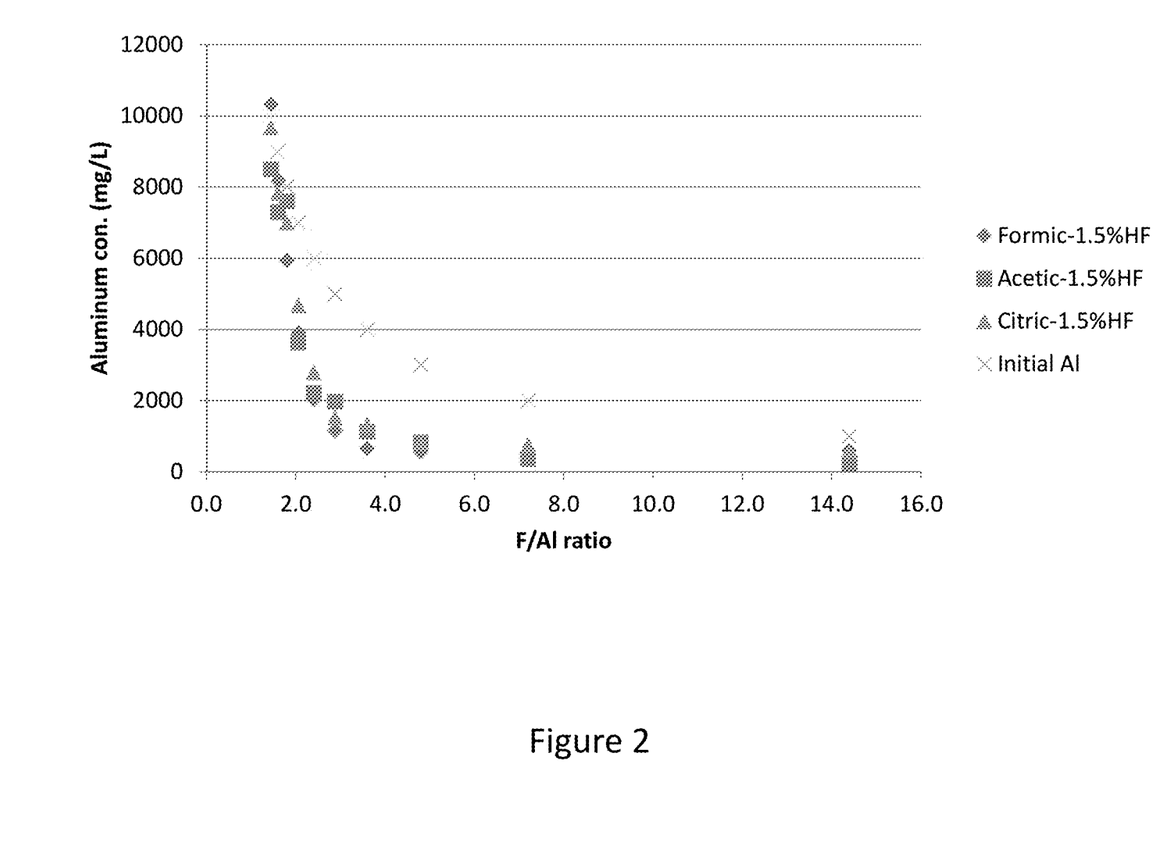
FIG. 2 is a graphical representation of aluminum concentration in accordance with one embodiment of the disclosure, illustrating the amount of aluminum in solution relative to the amount of aluminum initially added to the sample as a function of F/Al ratio.

The objective of this series of experiments was to evaluate impact of F/Al ratio on solubility of reaction products between HF and an aluminum source. In a typical experiment, the following steps were performed:
  An organic acid-1.5% HF acid solution was prepared.
  Aluminum chloride was added to an acid solution in an amount required to reach a targeted F/Al ratio.
  An aliquot of the solution was filtered and analyzed by ICP to measure aluminum concentration.
  Aluminum chloride was added to prepared organic acid-1.5% HF acid solutions in amounts sufficient to produce F/Al ratios ranging from 1.4 to 14.4. Three exemplary organic acids were chosen for this experiment, formic acid, acetic acid, and citric acid. Results of these experiments demonstrated that as F/Al ratio decreases, aluminum precipitation decreases. For example, no precipitate was observed at F/Al ratios below 1.9. Data presented in Table 2 show decreases in Al concentration of each solution relative to initial Al concentration. These measurements represent an indirect measure of $AlF_3$ precipitation. Results of these experiments are depicted graphically in FIG. 2.

TABLE 2

Calculated Decrease in Al Concentration in Organic Acid-HF Solutions as a Function of F/Al Ratio

| F/Al Ratio | Initial Al Concentration (mg/L) | % Decrease in Al Concentration | | |
|---|---|---|---|---|
| | | Formic acid-1.5% HF | Acetic acid-1.5% HF | Citric acid-1.5% HF |
| 1.4 | 10,000 | 0* | 15 | 3 |
| 1.6 | 9,000 | 9 | 19 | 13 |
| 1.8 | 8,000 | 26 | 5 | 12 |
| 2.1 | 7,000 | 44 | 48 | 33 |
| 2.4 | 6,000 | 66 | 63 | 53 |
| 2.9 | 5,000 | 77 | 61 | 69 |
| 3.6 | 4,000 | 83 | 72 | 67 |
| 4.8 | 3,000 | 81 | 73 | 73 |
| 7.2 | 2,000 | 77 | 82 | 62 |
| 14.4 | 1,000 | 41 | 75 | 42 |

Results of this experiment suggest that increasing concentration of aluminum to decrease F/Al ratio during formation stimulation decreases formation of precipitates, and consequently reduces damage to a sandstone formation treated with an organic acid-HF stimulation solution.

OTHER EMBODIMENTS

Some embodiments of the present application were described supra. It is, however, expressly noted that the application is not limited to those embodiments, but rather the intention is that additions and modifications to what was expressly described in the present disclosure are also included within the scope of the application. Moreover, it is to be understood that features of various embodiments described in the present disclosure were not mutually exclusive and can exist in various combinations and permutations, even if such combinations or permutations were not made express, without departing from the spirit and scope of the application. Therefore, the disclosure should not be limited to certain implementations, but rather should be limited only by the spirit and scope of the following claims.

What is claimed is:

1. A method of sandstone stimulation comprising:
  a step of contacting a sandstone formation with an acidizing solution comprising hydrofluoric acid or a hydrofluoric acid-generating precursor and a first aluminum salt; and
  a step of contacting the sandstone formation with a post-acidizing solution comprising a second aluminum salt after contacting the sandstone formation with the acidizing solution,
  wherein a combination of the acidizing and post-acidizing solutions in the sandstone formation provides a fluoride to aluminum molar ratio of 2:1 by weight or less.

2. The method of claim 1, further comprising a step of contacting the sandstone formation with a pre-flush solution comprising a first organic acid prior to contacting the sandstone formation with the acidizing solution.

3. The method of claim 2, wherein the first organic acid is selected from the group consisting of acetic acid, formic acid, citric acid, and combinations thereof.

4. The method of claim 2, wherein the pre-flush solution further comprises a first ammonium salt.

5. The method of claim 4, wherein the first ammonium salt is ammonium chloride.

6. The method of claim 1, wherein the first aluminum salt is aluminum chloride.

7. The method of claim 1, wherein the acidizing solution comprises a hydrofluoric acid-generating precursor comprising a second organic acid and an ammonium fluoride salt.

8. The method of claim 7, wherein the acidizing solution has a molar ratio of ammonium fluoride to aluminum chloride of about 1.9:1 or less.

9. The method of claim 8, wherein the acidizing solution is substantially free of precipitate after contacting with the sandstone formation.

10. The method of claim 1, wherein the post-acidizing solution further comprises a third organic acid.

11. The method of claim 1, wherein the post-acidizing solution further comprises a second ammonium salt.

12. The method of claim 1, wherein the post-acidizing solution comprises ammonium chloride or potassium chloride.

13. The method of claim 12, wherein the post-acidizing solution comprises ammonium chloride at a concentration in a range of about 3 wt % to about 5 wt %.

14. The method of claim 1, wherein a combination of the pre-flush, acidizing, and post-acidizing solutions in the sandstone formation provides a fluoride to aluminum ratio of less than 1.9:1.

15. An apparatus for stimulating sandstone acidization comprising:
  a first flow line configured to inject a pre-flush solution comprising a first organic acid into a sandstone formation;
  a second flow line configured to inject an acidizing solution comprising a hydrofluoric acid-generating precursor and a first aluminum salt into the sandstone formation; and
  a third flow line configured to inject a post-acidizing solution comprising a second aluminum salt into the sandstone formation, and
  wherein a combination of the acidizing and post-acidizing solutions injected from the apparatus to the sandstone formation provides a fluoride to aluminum molar ratio of 2:1 by weight or less.

16. The apparatus of claim 15, further coupled to a sensor to monitor pH.

17. The apparatus of claim 15, further coupled to a mass spectrometer and/or an atomic emission spectroscopy instrument to monitor aluminum fluoride precipitation.

18. A method of reducing aluminum fluoride precipitation during acidization of a sandstone formation comprising steps of:
  (a) injecting a pre-flush solution comprising a first organic acid into the sandstone formation;
  (b) injecting an acidizing solution comprising hydrofluoric acid or a hydrofluoric acid-generating precursor and a first aluminum salt into the sandstone formation; and
  (c) injecting a post-acidizing solution comprising a second aluminum salt into the sandstone formation, wherein a combination of the acidizing and post-acidizing solutions in the sandstone formation provides a fluoride to aluminum molar ratio of 2:1 by weight or less.

19. The method of claim 18, wherein the fluoride to aluminum molar ratio prevents and/or eliminates precipitates from contacting a sandstone formation after injecting the acidizing solution.

* * * * *